(12) United States Patent
Shirai

(10) Patent No.: US 6,354,010 B1
(45) Date of Patent: Mar. 12, 2002

(54) SURVEYING INSTRUMENT

(75) Inventor: Masami Shirai, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/294,204

(22) Filed: Apr. 20, 1999

(30) Foreign Application Priority Data

May 23, 1998 (JP) .......................................... 10-113867

(51) Int. Cl.$^7$ ............................ G01C 15/00; G01B 3/00
(52) U.S. Cl. ............................................ 33/292; 33/284
(58) Field of Search ........................... 33/227, 281, 282, 33/284, 285, 286, 290, 292, 1 PT; 250/201.2, 559.29; 318/640, 632; 348/345, 208, 142, 169

(56) References Cited

U.S. PATENT DOCUMENTS

| | | | |
|---|---|---|---|
| 4,660,954 A | * 4/1987 | Fujita et al. | ................ 396/75 |
| 4,825,394 A | * 4/1989 | Beamish et al. | ............ 356/147 |
| 5,313,409 A | * 5/1994 | Wiklund et al. | ........... 356/4.01 |
| 5,856,664 A | 1/1999 | Suzuki et al. | ............. 250/201.2 |
| 6,046,557 A | * 4/2000 | Godo | ......................... 318/257 |
| 6,194,694 B1 | * 2/2001 | Shirai | ...................... 250/201.2 |

FOREIGN PATENT DOCUMENTS

JP          7159160          6/1995

* cited by examiner

Primary Examiner—Diego Gutierrez
Assistant Examiner—R. Alexander Smith
(74) Attorney, Agent, or Firm—Greenblum & Bernstein P.L.C.

(57) ABSTRACT

A surveying instrument is provide with a telescope which is movably supported, an auto-focusing system. Based on a movement of the telescope, a moving status of the telescope is determined from among a rough sighting status, a fine sighting status, and a suspended status. A controlling system is further provided, which controls the auto-focusing system to perform the auto-focusing operation in accordance with the moving status detected by the movement detection system. If the status is the fine sighting status, the auto-focusing operation is continuously performed. If the status is the rough sighting status, then the auto-focusing operation is not executed.

21 Claims, 6 Drawing Sheets

SURVEYING INSTRUMENT

BACKGROUND OF THE INVENTION

The present invention relates to a surveying instrument employing a sighting telescope having an auto-focusing function.

Conventionally, a surveying instrument such as an electric distance meter, and an electronic theodolite have been known. The distance meter is for measuring a distance to an aiming point, and the theodolite, or an angle measuring instrument is for measuring horizontal and vertical (elevational) angles between a reference point and an aiming point.

In such a surveying instrument, a sighting telescope is provided for accurately sighting the instrument on an aiming point. By aligning the sighting telescope so that the aiming point is located at the center of field of view, the axis of distance measuring or measuring the horizontal and elevational angles is aligned to intersect the aiming point.

Recently, a total station, which has functions of both the distance measuring instrument and the angle measuring instrument, has been generally used. In the total station, both the distance and the angles (horizontal and elevational angles) of the aiming point are measured at a time by directing the sighting telescope to the aiming point.

In order to view the aiming point clearly within the field of view of the sighting telescope, a focusing mechanism is provided. The focusing mechanism is to be manipulated so that an in-focus image of the aiming point is formed. To ease the focusing operation, recently, sighting telescopes having an auto-focusing function have been employed in the surveying instruments.

With the auto-focusing function, the focusing condition of the sighting telescope is automatically adjusted. Thus, the auto-focusing function makes the operator free from troublesome manipulation of focusing mechanism, and allows the operator to concentrate on centering the aiming point in the field of view of the sighting telescope.

In such a conventional sighting telescope, however, the operator is required to manually operate a switch for actuating the auto-focusing function when the auto-focusing operation is to be executed. To operate the switch when the sighting telescope is being aligned (moved) is bothersome. Further, the operator may push a wrong button by mistake, or the operator may unintentionally turn the telescope by pushing the switch too hard.

SUMMARY OF THE INVENTION

It is therefore, an object of the present invention to provide an improved surveying instrument provided with a sighting telescope having an auto-focusing function which is easy to operate.

For the above object, according to the present invention, there is provided a surveying instrument, which includes: a telescope utilized for sighting at an aiming point; an auto-focusing system that executes an auto-focusing operation for automatically adjusting focusing condition of the telescope; a supporting member that movably supports the telescope; a movement detection system that detects moving status of the telescope; and a controlling system that controls the auto-focusing system to perform the auto-focusing operation in accordance with a moving status of the telescope.

With this constitution, since the auto-focusing system is operated automatically, operability of the surveying instrument is improved, without the defects of the prior art. Thus, the surveying instrument is easy to operate, and further unintentional operation such as pushing of wrong buttons and/or unintentional turning of the telescope can be prevented.

Optionally, the supporting member may allow vertical rotation and/or horizontal rotation of the telescope.

Further optionally, the movement detection system may detect a moving speed of the telescope, the moving speed being defined as a moving amount within a predetermined unit period.

Thus, it is possible to determine whether the telescope is quickly moved for a rough sighting or slowly moved for a fine sighting can be determined based on the detected moving speed. The moving speed may be detected with use of an encoder, as an amount of movement or rotation of the telescope within a unit period. Such an amount represents an angular speed or rotation speed of the telescope. Alternatively, it may also be possible to use a device for directly measuring the angular speed or the rotation speed.

It is possible that the controlling system categorizes moving speeds of the telescope into a plurality of ranges, and determines a range where the detected moving speed is included, and that the controlling system controls the auto-focusing system in accordance with the range where the detected moving speed is included.

In this case, the plurality of ranges may include first, second and third ranges, a moving speed included in the first range being slower than that included in the second range, a moving speed included in the second range being slower than that included in the third range, and wherein the controlling system controls the auto-focusing system to perform the auto-focusing operation whenever the moving speed detected by the detecting system is included in the second range.

Optionally, the controlling system may control the auto-focusing system to perform the auto-focusing operation by a predetermined times when a previously detected moving speed is included in the second range or third range, and a currently detected moving speed is included in the first range.

With this constitution, the power consumption of the auto-focusing system is reduced in comparison with a case where the auto-focusing system operates continuously, since the auto-focusing operation is performed only when it is necessary.

Alternatively or optionally, the plurality of ranges may include first, second, and third ranges, a moving speed included in the first range being slower than that included in the second range, a moving speed included in the second range being slower than that included in the third range, and the controlling system may control the auto-focusing system to perform the auto-focusing operation intermittently while the moving speed is included in the second range.

In this case, the frequency of the auto-focusing operations, which are performed while the moving speed is included in the second range, is greater as the moving speed is slower.

Further optionally, the second range may be divided into a first sub-range and a second sub-range. In this case, a first or a second frequency is selected depending on whether the moving speed is included in the first sub-range or the second sub-range.

Alternatively, the moving speed of the telescope may be divided into a first and a second ranges, a moving speed included in the first range being slower than that included in the second range, and the controlling system controls the auto-focusing system to perform the auto-focusing operation only when the moving speed is included in the first range. In this case, only one threshold value is referred to.

According to another aspect of the invention, there is provided a surveying instrument, which includes: a telescope utilized for sighting at an aiming point; an auto-focusing system that performs an auto-focusing operation for automatically adjusting focusing condition of the telescope; a supporting member that movably supports the telescope; a movement detection system that detects, based on a movement of the telescope, a moving status of the telescope, the moving status including a rough sighting status, a fine sighting status, and a suspended status; and a controlling system that controls the auto-focusing system to perform the auto-focusing operation in accordance with the moving status detected by the movement detection system.

Optionally, the controlling system may allow the auto-focusing system to perform the auto-focusing operation when the moving status of the telescope is the fine sighting status, while inhibit the auto-focusing system from performing the auto-focusing operation when the moving status of the telescope is the rough sighting status.

Further optionally, the controlling system may control the auto-focusing system to perform the auto-focusing operation immediately when the moving status of the telescope has changed to the suspended status, and inhibit the auto-focusing operation thereafter, until the moving status of the telescope is changed to the fine sighting status.

Since the auto-focusing system is controlled in accordance with the moving status of the telescope, the auto-focusing operation is executed only when it is necessary, and is not executed when it is unnecessary. Accordingly, operability of the surveying device is improved.

Further optionally, the controlling system may control the auto-focusing system to perform the auto-focusing operation continuously or intermittently while the moving status of the telescope is the fine sighting status.

When the auto-focusing operations are executed intermittently, the frequency thereof may be determined to be greater as a moving speed of the telescope is faster.

Still optionally, the moving speed of the telescope, when the moving status of the telescope is the fine sighting status, may be divided into a plurality of ranges, and in this case, the frequency of the auto-focusing operations may vary in accordance with a range where the moving speed of the telescope is included.

It should be noted that the surveying instrument according to the invention may include a distance metering device and/or a device that detects horizontal and elevational angles between a reference point to an aiming point, with respect to a predetermined station.

BRIEF DESCRIPTION OF THE ACCOMPANYING DRAWINGS

DETAILED DESCRIPTION OF THE EMBODIMENTS

A total station to which embodiments of the invention are applicable will be described firstly, and then three embodiments will be described in detail with reference to the accompanying drawings. The total station is defined as an instrument having a function of distance metering instrument for measuring a distance, and a function of theodolite for measuring horizontal and elevational angles.

First Embodiment

Figure 1:
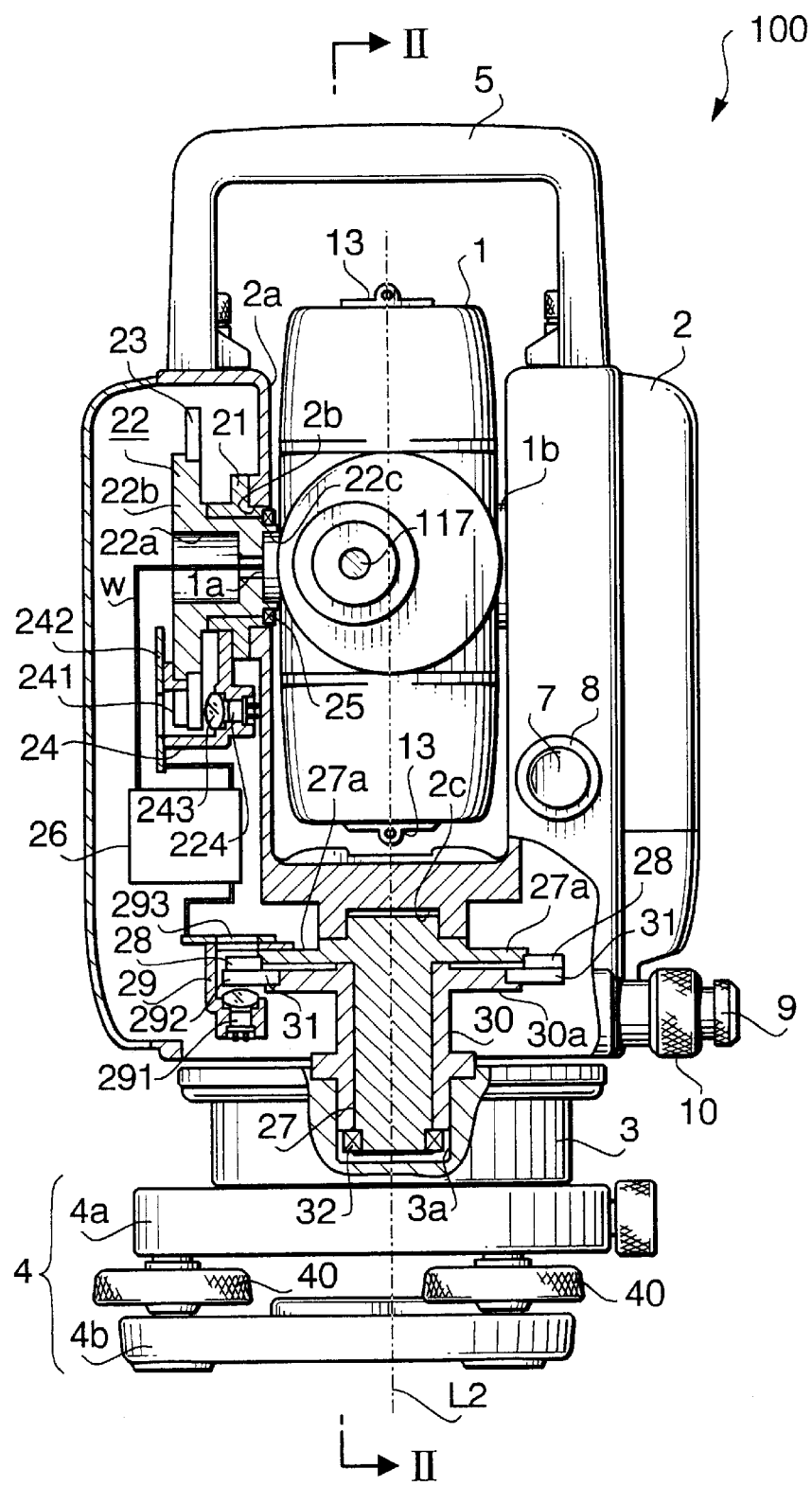
FIG. 1 is a partially sectioned front view showing a surveying instrument according to a first embodiment of the present invention.
Figure 2:
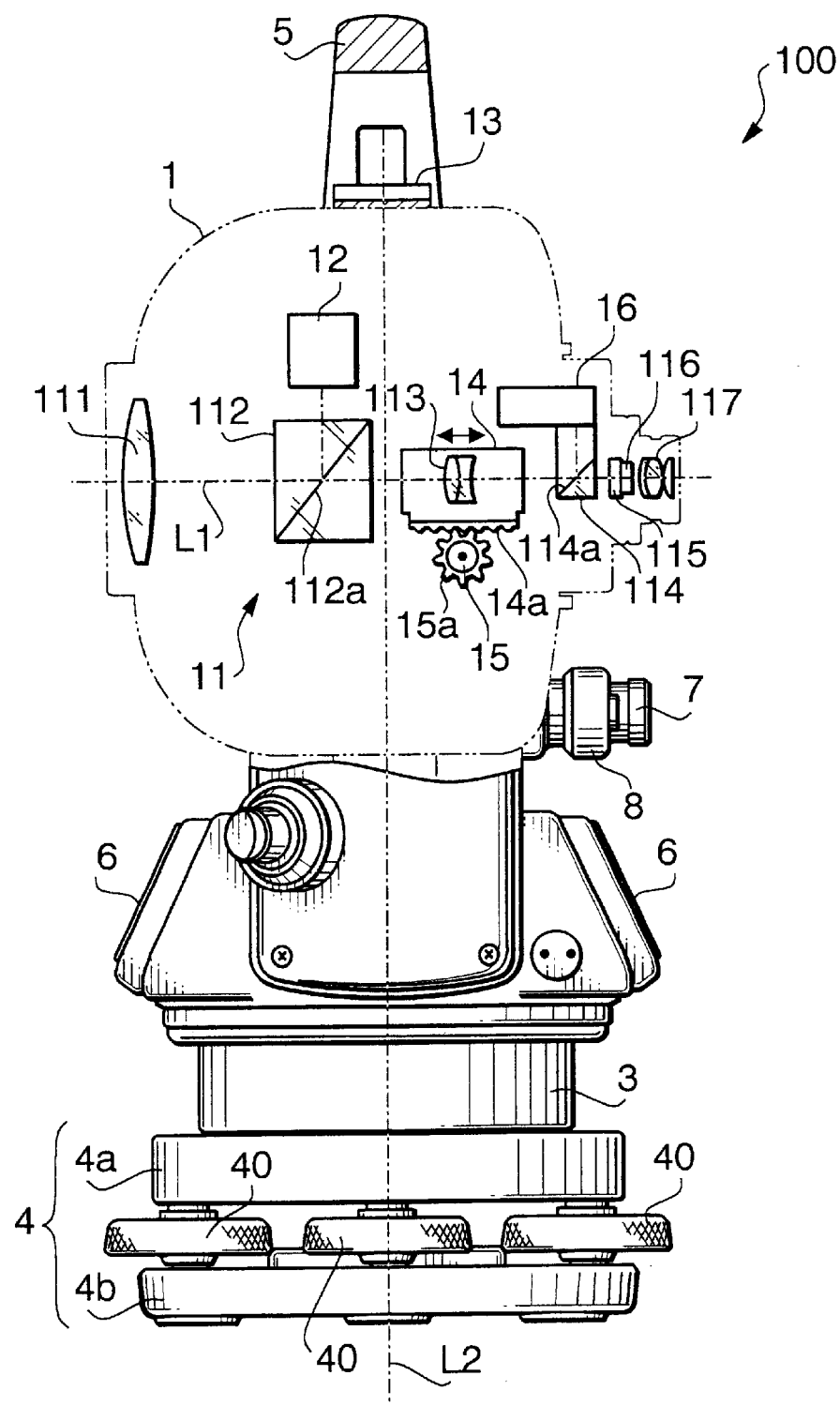
FIG. 2 is a partially sectioned (taken from the line II—II in FIG. 1) side view of the surveying instrument.

FIG. 1 is a partially sectioned front view of a total station 100 according to an embodiment of the present invention, and FIG. 2 is a partially sectioned side view, taken along line II—II in FIG. 1, of the total station 100.

As shown in FIGS. 1 and 2, the total station 100 is provided with a leveling board 4, a stage 3, a U-shaped support 2, and a grip 5.

A telescope unit 1 is rotatably supported by the U-shaped support 2. The telescope unit 1 includes a telescope 11 and an electronic distance metering unit 12. By sighting the telescope unit 1 on an aiming point, where a reflector (corner cube) is placed, the distance to the aiming point and the horizontal and vertical angles between a predetermined reference point and the aiming point are measured.

Specifically, the electronic distance metering unit 12 measures a distance to the target, which is located on the optical axis of the telescope 11, by emitting modulated light beam to the reflector and receiving the reflected beam, via an objective lens 111 of the telescope 11.

As shown in FIG. 2, the telescope 11 has an objective lens 111, a dichroic prism 112, a focusing lens 113, a beam splitter 114 for AF sensor, a covering glass 115, a cross hair focusing plate 116, and an eyepiece 117.

L1 denotes the optical axis L1 of the objective lens 11, and will also be referred to as a sighting axis.

The dichroic prism 112 has a beam splitting surface 112a which is inclined by 45 degrees with respect to the sighting axis L1. The beam splitting surface 112a reflects 100% of incident infrared light, and allows 100% of incident visible light to pass therethrough.

The focusing lens 113 is a negative lens having a shorter focal length than the objective lens 111. The focusing lens 113 is held in a barrel 14. The barrel 14 is movable, together with the focusing lens 113, along the sighting axis L1 for focusing.

Specifically, on the outer circumferential surface of the barrel 14, a rack 14a, which extends in parallel with the sighting axis L1, is formed. The rack 14a is engaged with a pinion 15a which is driven by a focusing lens driving unit 15. As the focusing lens driving unit 15 rotates the pinion 15a, the focusing lens 113 moves back and forth (right-and-left direction in FIG. 2) along the sighting axis L1, and the image plane moves in a direction parallel to the sighting axis L1.

The beam splitter 114 has a beam splitting surface 114a which is inclined by 45 degrees with respect to the sighting axis L1. The beam splitting surface 114a reflects a part of incident light, and allows the remaining to pass therethrough.

The cross hair focusing plate 116 is a parallel glass plate, which has cross hairs on a surface (i.e., an image receiving plane) facing the covering glass 115. The crossing point of the cross hairs indicates the center of the field of view of the In telescope 11. The covering grass 115 is also a parallel glass plate, which prevents particles of dust from adhering on the image receiving plane of the cross hair focusing plate 116.

The eyepiece 117 has a group of lenses and exhibits a positive power. Through the eyepiece 117, the operator observes the enlarged image of the cross hairs as well as the image formed on the image receiving plane of the cross hair focusing plate 116.

A distance to the aiming point is measured with the electronic distance metering unit 12. It should be noted that when the distance to the aiming point is measured, the sighting axis L1 is aligned to intersect the aiming point. The electronic distance metering unit 12 is arranged on an optical path which is deflected upwardly by the dichroic prism 112. The electronic distance metering unit 12 emits a periodically amplitude-modulated infrared light beam to the dichroic prism 112. The modulated light beam is reflected by the beam splitting surface 112a, and directed, via the objective lens 111, to the reflector (i.e., the corner cube) located at the aiming point. The light beam is then reflected by the reflector, passing through the objective lens 111, reflected by the beam splitting surface 112a, and is incident on the electric distance metering unit 12. The electric distance metering unit 12 detects a phase difference between the emitted light beam and the received light beam, and transmits the detected phase difference to a control circuit 26 (an electric distance metering unit controller 121).

The objective lens 111 functions, on one hand, as a collimating lens which collimates the light beam emitted by the electric distance metering unit 12 and directing the light beam toward the reflector as a parallel light beam, and, on the other hand, as a collecting lens for collecting the light beam reflected by the reflector and directing the reflected beam to the dichroic prism 112 as a converging beam.

A focusing sensor 16 is arranged on another optical axis split by the beam splitter 114. The focusing sensor 16 is widely employed in auto-focusing systems for single lens reflex cameras, and uses a phase difference detecting method. The focusing sensor 16 detects a defocus amount with respect to the image receiving plane (a plane conjugate therewith) of the cross hair focusing plate 116. A defocus signal, which represents the defocus amount, is transmitted from the focusing sensor 16 to the control circuit 26.

As shown in FIG. 1, on the top and the bottom portions of the telescope unit 1, two sighting scopes 13, each of which has an optical axis parallel to the sighting axis L1, are provided.

On the both side surfaces of the telescope unit 1, a pair of vertical rotation shafts 1a and 1b, which have the common rotation axis, are protruded.

At the U-shaped portion 2a of the support 2, the telescope unit 1 is vertically rotatably supported. A bearing (not shown) for receiving the rotation shaft 1b is provided on the inner side of the right-hand side member of the support 2 in FIG. 1. On the inner side of the left-hand side member of the support 2 in FIG. 1, a hole 2b is formed. A cylindrical sleeve 21 is fitted into the hole 2b. Further, another sleeve 22 is fitted in the sleeve 21. The sleeve 22 is constituted to have a cylindrical part 22a, an outer flange 22b, and a fitting part 22c. The cylindrical part 22a is rotatably fitted into the sleeve 21.

An anti-slip-off ring 25 is screwed onto a thread formed on the outer circumferential surface of the fitting part 22c in order to prevent the sleeve 22 from slipping off the sleeve 21.

The rotation shaft 1a is fitted into the fitting part 22c, and unitarily fixed to the fitting part 22c.

With the constitution described above, the telescope unit 1 is supported by the support 2, and rotatable about the horizontal axis. Further, the sleeve 22 rotates as the telescope unit 1 rotates.

A rotational scale 23, made of transparent parallel plate, is provided on the outer side of the outer flange 22b. On the rotational scale 23, radially extending graduation lines are formed at equal intervals.

A vertical encoder unit 24 is mounted, on the outer flange unitarily formed on the sleeve 21, for reading the graduation lines on the rotational scale 23. The vertical encoder unit 24 includes an LED (light emitting diode) 244 and a collimator lens 243 for emitting a parallel light beam towards the rotational scale 23, a sub scale plate 241 located on the opposite side, a with respect to the rotational scale 23, to the collimator lens 243, and a light receiving circuit 242 which receives the light beam passed through the rotational scale 23 and the sub scale plate 241. The LED 244, collimator lens 243, the sub scale plate 241, the light receiving circuit 242 are supported by a flange member.

The sub scale 241 is a transparent parallel plate, and has two trains of radial graduation lines at the same intervals as the graduation lines of the rotational scale 23. The two trains of radial graduation lines are inner train and outer train, and they have phase difference of one quarter of an interval of the graduation lines.

The light receiving circuit 242 has two light receiving elements which receive light beams passed through the two trains (i.e., the inner and outer trains) of graduation lines on the sub scale plate 241, respectively. Two signals generated by the light receiving elements are transmitted to the control circuit 26.

With the constitution described above, in accordance with the rotation of the telescope unit 1, as the rotational scale 23 rotates, two signals having a phase difference of one-quarter an interval are generated by the vertical encoder unit 24, and the two signals are transmitted to the control circuit 26. The control circuit 26 detects the amount and the direction of the vertical rotation of the telescope unit 1 based on the two signals transmitted from the vertical encoder unit 24.

On the upper surface of the stage 3, a hole 3a is formed. In the hole 3a, the lower end of a sleeve 30, having an outer flange 30a at its upper end portion, is fitted into the hole 3a. On the rim of the outer flange 30a, a main rotational scale plate 31, which is a transparent parallel plate, is fixedly provided. On the main rotational scale plate 31, radial graduation lines are formed at even intervals.

A shaft 27 is rotatably inserted into the sleeve 30. The lower end of the shaft 27 is protruded from the lower end of the sleeve 30, and exposed to the inner surface of the hole 3a. On the outer circumferential surface of the lower end portion of the shaft 27 which is protruded from the lower end of the sleeve 30, a thread is formed, onto which an anti-slip-off ring 32 is screwed. The upper end of the shaft 27 is fitted into a cavity 2c formed on the bottom surface of the support 2, and fixed thereto.

With the constitution described above, the support 2 is mounted on the stage 3, and is rotatable about a vertical axis. In accordance with the rotation of the support 2, the shaft 27 rotates relative to the main rotational scale 31.

An outer flange 27a is formed at the upper end portion of the shaft 27. The outer flange 27a faces the outer flange 30a of the sleeve 30. On the rim of the outer flange 27a, a sub scale 28 is fitted. The sub scale 28 is a transparent parallel plate and has substantially the same shape as that of the main scale plate 31. The sub scale 28 has two trains of radial graduation lines at the same intervals as that of the main rotational scale 31. Two trains of radial graduation lines include the inner train and the outer train, and they have a phase difference of one-quarter an interval of the graduation lines of the main scale 31.

A horizontal encoder unit 29 is secured on the outer flange 27a. The horizontal encoder unit 29 is utilized to read the radial graduation lines on the main rotational scale 31. The horizontal encoder unit 29 includes an LED (light emitting diode) 291 and a collimator lens 292 for emitting a light beam towards the main rotational scale 31, and a light receiving circuit 293 for receiving the light beam passed through the main rotational scale 31 and the sub scale 28. The LED 291, collimator lens 292 and the light receiving circuit 293 are mounted on a flange member.

The light receiving circuit 293 has two light receiving elements respectively for receiving the light beams passed through the two trains (i.e., the inner and outer trains) of scales on the sub scale plate 31. Two signals respectively generated by two light receiving elements are transmitted to the control circuit 26.

With the constitution described above, in accordance with rotation of the support 2, the shaft 27 rotates, together with the horizontal encoder unit 29, relative to the main rotational scale 31, two signals having one-quarter phase difference are generated, and the signals are transmitted to the control circuit 26. The control circuit 26 detects the amount and the direction of the horizontal rotation of the support 2 in accordance with the signals generated by the horizontal encoder unit 29.

As shown in FIG. 2, on the front and rear surface of the support 2, two operation panels 6 are provided. Various data and operation commands can be input through the panels 6, and data and messages output by the control circuit 26 are displayed on a display area of each operation panel 6.

A vertical fixing screw 7, which is provided on the rear surface of the support 2, is a screw for fastening and releasing a vertical clamp mechanism (not shown) which restricts rotation of the shaft 1b relative to the support 2. When the vertical fixing screw 7 is fastened, the telescope unit 1 can not be rotated in a vertical direction by external forces.

A horizontal fixing screw 9 (see FIG. 1), which is provided on the side surface of the support 2, is a screw for fastening and releasing a horizontal clamp mechanism (not shown) which restricts the rotation of the support 2 relative to the sleeve 30. When the horizontal fixing screw 9 is fastened, the telescope unit 1 can not be rotated in a horizontal direction by external forces.

A vertical tangent screw 8, which is provided coaxially with the vertical fixing screw 7, is utilized to slowly rotate the telescope unit 1 vertically with respect to the support 2. By turning the vertical tangent screw 8, a vertical rotational position of the telescope unit 1 can be adjusted precisely.

A horizontal tangent screw 10, which is provided coaxially with the horizontal fixing screw 9, is utilized to rotate the telescope unit 1 horizontally with respect to the stage 3. By turning the horizontal tangent screw 10, a horizontal rotational position of the telescope unit 1 can be adjusted precisely.

In the upper part of the support 2, over the U-shaped portion 2a, the grip 5 is detachably mounted. When an aiming point is located above the total station, the operator can remove the grip 5 from the support 2 so that the view of the telescope unit 1 will not be obstructed. Further, when an angle formed between an upper-front point and an upper-rear point is to be measured, the operator can also detach the grip 5 from the support 2 so that swinging movement of the telescope unit 1 will not be interfered with by the grip 5.

The leveling board 4 includes an upper plate 4a, a lower plate 4b, and three leveling screws 40 provided between the upper and lower plates 4a and 4b. The leveling screws 40 are provided at equal angular intervals between peripheral portions of the upper and lower plates 4a and 4b. Each leveling screw 40 has a projection, extension amount of which can be varied by turning the leveling screw 40. By adjusting the extension amount of the projection of each of the leveling screws 40, the upper plate 4a is made inclined with respect to the lower plate 4b so that the vertical rotation axis (L2) of the shaft 27 coincides with the direction of gravity.

With the constitution described above, the telescope unit 1 can be aimed to any desired direction. The direction in which the telescope unit 1 is aimed can be detected as horizontal and elevational angles based on the output signals of the vertical encoder unit 24 and the horizontal encoder unit 29.

Control Circuit

The control circuit 26 for controlling the AF (Auto-Focus) operation will be described in detail hereinafter.

The electronic distance metering unit 12, provided in the telescope unit 1, is connected to the control circuit 26, which is provided in the support 2, via a wire w passing through a hole formed in the center of the cylindrical part 22a of the sleeve 22 (see FIG. 1). A focusing lens driving unit 15, a focus point sensor 16, the vertical encoder unit 24, the horizontal encoder unit 29, and the operation panels 6 are also connected to the control circuit 26.

The control circuit 26 controls the electronic distance metering unit 12 to operate in accordance with the commands inputted through the operation panels 6, and receives the phase difference information representative of the distance to the object (i.e., the aimed point) which is located on the sighting axis L1. Based on the phase difference information, the control circuit 26 calculates the distance to the object, and displays the results in the display screens of the operation panels 6. Further, based on the signals transmitted from the vertical encoder unit 24 and the horizontal encoder unit 29,the control circuit 26 calculates the elevational angle and the horizontal angle of the sighting axis L1 with respect to a reference direction at which the angles are set to zero.

Figure 3:
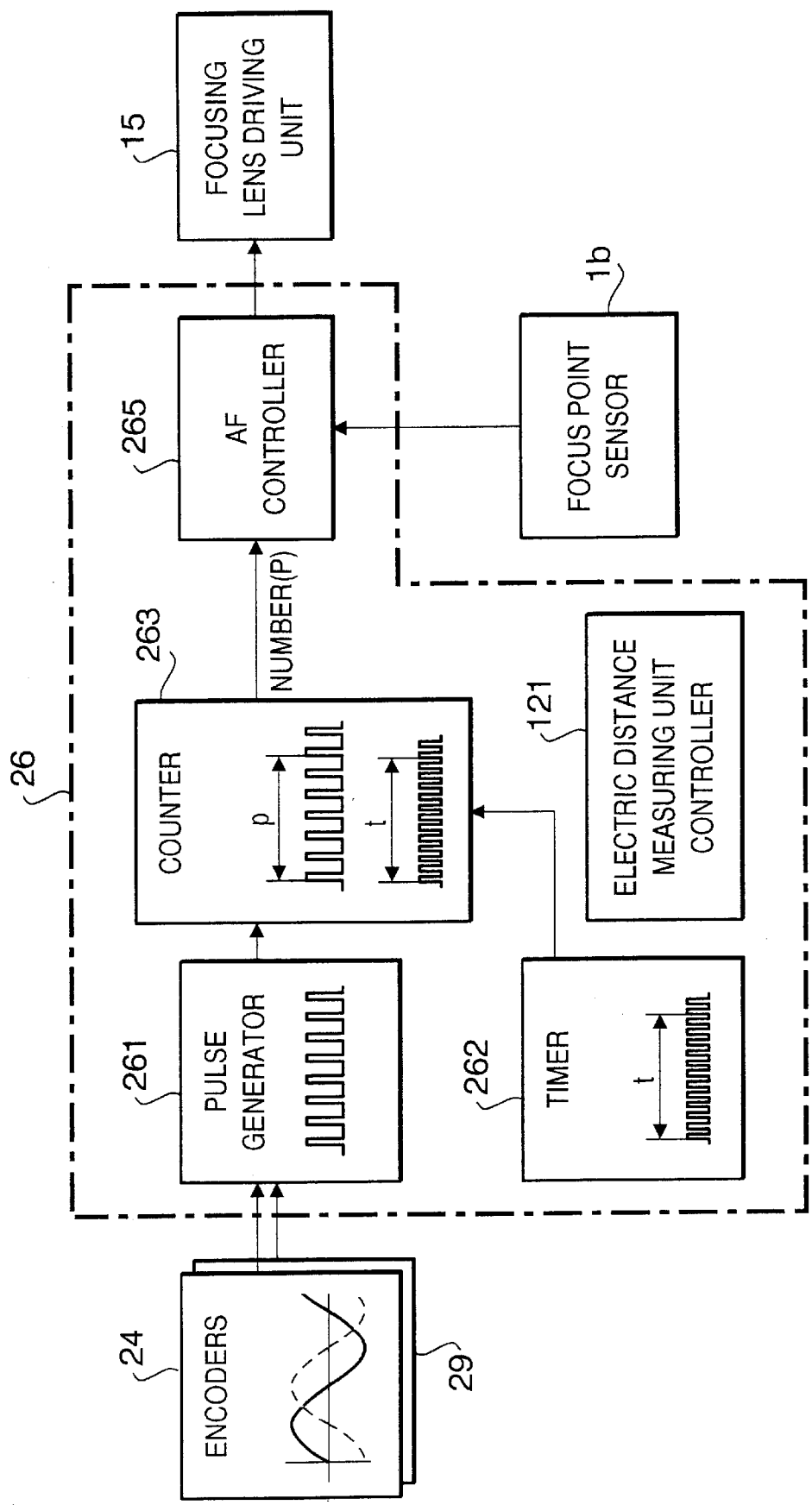
FIG. 3 is a block diagram showing a part of a system of an the surveying instrument.

FIG. 3 is a block diagram showing a constitution of a part of a control circuit 26 related to the auto-focusing function.

The control circuit 26 includes, as shown in FIG. 3, a pulse generator 261, a timer 262, a counter 263, and an AF (Auto-Focus) controlling unit 265.

The pulse generator 261 receives the signals (sine waves) output by the encoder units 24 and 29, detects the phases of the received signals, generates four pulses at every one cycle of the pair of signals received from the encoder unit 24 and 29, and outputs the pulses to the AF controller 265. The timer 262 generates twelve pulses within a predetermined unit time (t), and transmits the pulses to the counter unit 263. It should be noted that the number of the pulses (twelve), generated within a unit time, may be varied optionally.

The counter unit 263 counts the number of the pulses transmitted from the pulse generator 261 within a duration (t) within which the twelve pulses are transmitted from the timer 262. That is, the counter unit 263 counts the number (p) of the pulses within a unit time (t). Therefore, the number (p) corresponds to the rotated angle or moving speed within the unit time (t).

In other words, the numbers counted by the counter unit 263 correspond to a vertical angular speed or rotation speed of the telescope unit 1 relative to the support 2 (when the signal transmitted from the encoder 24 is processed), and a horizontal angular speed or rotation speed of the support 2 relative to the stage 3 (when the signal transmitted from the encoder 29 is processed). The numbers (P) of the pulses counted by the counter unit 263 are transmitted to the AF controlling unit 265.

The AF controlling unit 265 controls the focusing lens driving unit 15 to move the barrel 14 (and therefore the focusing lens 113) in accordance with the numbers of the pulses transmitted from the counter unit 263 and the defocus information transmitted from the focus point sensor 16.

Figure 4:
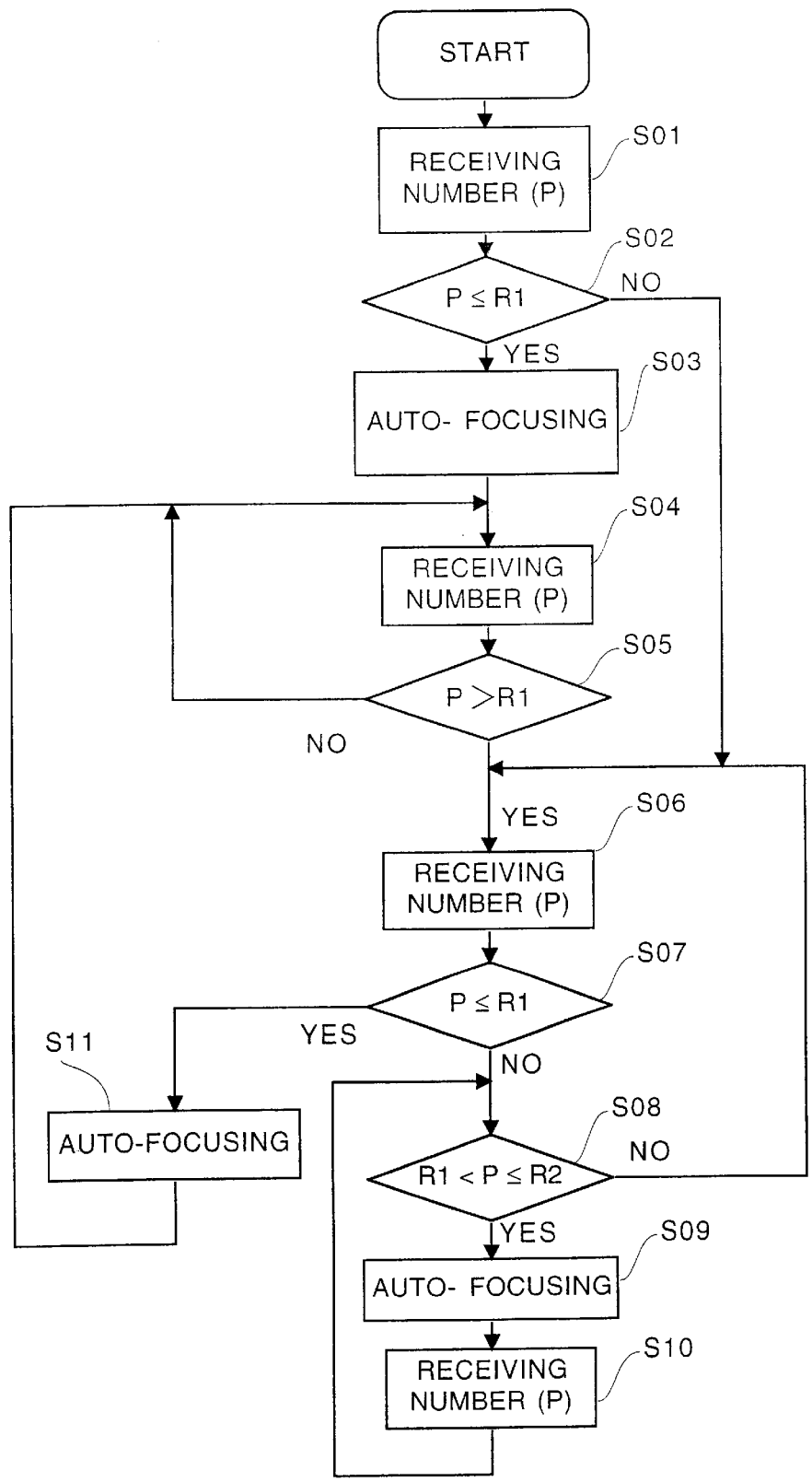
FIG. 4 is a flowchart showing a process performed in an AF controller of the first embodiment.

FIG. 4 is a flowchart showing a process performed by the AF controlling unit 265 according to the first embodiment.

The process shown in FIG. 4 starts when the power is supplied. Firstly, the AF controlling unit 265 receives the number (P) of the pulses from the counter unit 263 (S01) As described above, the number (P) represents the vertical or horizontal angular speed of the telescope unit 1. In the following description, processes regarding the vertical direction and the horizontal direction are not separately described, the same processes are executed for both directions, alternately or simultaneously. Therefore, the number (P) in the following description and drawings should be interpreted either the number (P) representing the vertical rotation or the horizontal rotation. It should be noted that, in the same flowchart, the number (P) should be interpreted in the same manner.

In S02, the AF controlling unit 265 determines whether the number (P) is less than or equal to a first reference value R1. In this embodiment, the first reference value R1 corresponds to a first reference angular speed V1. In this embodiment, the first angular speed V1 equals 0' (minute)/sec. Thus, in S02, it is determined whether the telescope unit 1 is moved or not. If the number (P) is greater than the first reference value R1 (i.e., if the telescope unit is being moved) (S02: NO), control goes to S06.

In S02, if it is determined that the number (P) is less than or equal to the first reference value R1 (S02: YES), then the AF controlling unit 265 performs an auto-focusing operation (S03). That is, the AF controlling unit 265 controls the focus point sensor 16 to start operating, receives the information representative of a defocus amount from the focus point sensor 16, calculates the amount and the direction of movement of the focusing lens 113 in order to compensate for the defocus amount, and then controls the focusing lens driving unit 15 to move the focusing lens 113 by the calculated amount.

It should be noted that, in S03, the auto-focusing operation is performed once (not continuously). When the auto-focusing operation has been performed, the defocus amount is reduced to an allowable amount. After the auto-focusing operation has been performed in S03, control goes to S04.

In S04, the AF controlling unit 265 receives the number (P) of the pulses successively transmitted from the counter unit 263. Then, in S05, it is determined whether the number (P) exceeds the first reference value R1 (which corresponds to the angular speed of 0'/s). That is, in S05, it is determined whether the telescope unit 1 is being moved.

If the telescope unit 1 is not being moved, a loop of steps S04 and S05 is repeatedly executed (i.e., the successive number (P) is received and compared with the first reference value R1) until the received number (P) exceeds the first reference value R1 (i.e., until it is determined that the telescope unit 1 is being moved).

When the number (P) is greater than the first reference value R1 (S05: YES), i.e., when the telescope unit 1 is moved, control goes to S06.

In S06, the next number (P) is received, and it is determined, in S07, whether the number (P) is less than or equal to the first reference value R1 (i.e., it is determined whether the telescope unit 1 is being moved).

If the number (P) is less than or equal to the first reference value R1 (YES: S07), the auto-focusing operation is executed (S11) to reduce the defocus amount to the allowable amount. Then, control returns to S04, in which the number (P) successively transmitted from the counter unit 263 is received again. It should be noted that, when controls proceeds from S05 to S07 through S06, it is likely that the received number (P) is greater than the first reference value R1. However, when control proceeds from S08 to S07 through S06, the telescope unit 1 may have been moved and stopped. In such a case, control proceeds from S06 to S11 through S07.

In S07, if the number (P) is greater than the first reference value R1 (NO: S07), i.e., if the telescope unit 1 is moved, control goes to S08.

In S08, it is determined whether the number (P) is greater than the first reference value R1 and less than or equal to a second reference value R2. As described above, the reference value R1 corresponds to the angular speed of 0'/sec. In the first embodiment, the second reference value R2 corresponds to an angular speed of 20'/sec. which is considered to be a threshold between angular speeds of a fine sighting and a rough sighting. If it is determined, in S08, that the number (P) is greater than the first reference value R1 and less than or equal to the second reference value R2 (YES: S08), i.e., if the telescope unit 1 is being moved at the angular speed of the fine sighting, the auto-focusing operation is executed (S09). Then, the AF controlling unit 265 receives the successive number (P) again (S10). Thereafter, control returns to S08 to determine whether the telescope unit 1 is moved or not, and if moved, whether the rough sighting is performed or the fine sighting is performed. As far as the number (P) is greater than the first reference value R1 and less than or equal to the second reference value R2, i.e., as far as the telescope unit 1 is moved for fine sighting, the auto-focusing operation is executed repeatedly, or continuously.

If, in S08, it is determined that the number (P) is not greater than the first reference value RI, or is greater than the second reference value R2 (NO: S08), i.e., if the telescope unit 1 is not moved, or moved at the angular speed of the rough sighting, control returns to S06. If the telescope unit 1 is kept moved for the rough sighting, a loop of S06, S07 and S08 is repeated. Therefore, during the rough sighting, the auto-focusing operation is not executed.

Operation of the First Embodiment

The operation of the total station 100 according to the first embodiment will be described hereinafter.

Firstly, the operator places the reflector at an aiming point, installs the total station at a measuring station, and turns on the main switch of the total station.

When the main switch is turned on, the process shown in FIG. 4 is initiated. The AF controlling unit 265 receives the number (P) from the counter unit 263 (S01). Then, it is determined whether the telescope unit 1 is being moved (S02).

If the telescope 1 is not moved (S02: YES), and the auto-focusing operation is executed (S03) so that the defocus amount is reduced to the allowable amount. If the telescope unit 1 is being moved (S02: NO), control goes to S06.

After the auto-focusing operation has been executed (S03), the operator may sight the telescope 11 on the aiming point (i.e., the reflector). At the initial stage of sighting (rough sighting), the telescope unit 1 is to be roughly moved. Accordingly, the sighting scope 13, which has a wider field of view than the telescope 11, is used for sighting the telescope unit 1 at the reflector. For the rough sighting, the telescope 11 may be moved by a relatively large amount. Since the moving amount of the telescope unit 1 using the tangent screws 8 and 10 is relatively small, the operator may release the fixing screws 7 and 9, and adjusts the direction of the telescope unit 1 by manually moving the telescope 11.

During this rough sighting, the control circuit 26 (the counter unit 263) counts the number of the pulses generated in accordance with movement of the telescope unit 1 with respect to the support 2, based on the signals transmitted from the vertical encoder unit 24 and the horizontal encoder unit 29, respectively. In this process, if the telescope unit 1 is moved directly by hand, the number (P) is greater than the second reference value R2 which is greater than the first reference vaue R1 (YES: S05; NO: S07; NO: S08; NO: S07; NO: S08; . . . ). Therefore, the auto-focusing is not executed while the telescope unit 1 being moved directly by hand, or rough sighting is executed.

After the rough sighting has been finished, the operator fastens the fixing screws 7 and 9 in order to prevent the telescope unit 1 from being turned by external forces.

During this fastening operation, the telescope unit 1 is not moved (YES: S07), and the auto-focusing operation (S11) is performed once. Thereafter, the number (P) is received (S04) and examined (S05). The loop of S04 and S05 (NO) is repeated as far as the telescope unit 1 remains unmoved.

As described above, when the rough sighting is performed, the auto-focusing operation is not executed, and when the rough sighting has been finished and the telescope unit 1 is stopped, the auto-focusing operation is executed once. Thereafter, the auto-focusing operation is not executed as far as the telescope unit 1 remains unmoved. Since the rough sighting is executed using the sighting scope 13, it is not necessary to execute the auto-focusing operation. Thus, as described above, during the rough sighting, the auto-focusing operation is not executed. After the rough sighting has been finished, the fine sighting will be executed with use of the telescope 11. Thus, when the telescope unit 1 is stopped, the auto-focusing operation is executed once. As far as the telescope is unmoved, it is not necessary to execute the auto-focusing operation repeatedly or continuously, and thus, as described above, after the auto-focusing operation has been executed once, control repeats the loop of S04 and S05 and does not execute the auto-focusing operation until the telescope unit 1 is moved again.

With this control, the operator is able to obtain an in-focus image as well as the image of the cross hairs through the eyepiece 117 when the fine sighting is performed without operating any switch.

After the rough sighting has been finished and the operator fastens the fixing screws 7 and 9, the fine sighting can be performed using the telescope 11 as a sighting scope. The fine sighting is done by moving the telescope unit 1 using the tangent screws 8 and 10 and locate the aiming point (i.e., the reflector) at the crossing point of the cross hairs.

During the fine sighting, the number (P) is greater than the first reference value R1 and less than or equal to the second reference R2 (YES: S08). Therefore, the loop of S08, S09 and S10 is repeatedly executed, and accordingly, the auto-focusing operation is repeatedly executed. Thus, during the fine sighting process, the operator is able to observe an in-focus image of the object as well as the cross hairs, without operating any switch.

It should be noted that, even if the fine sighting is done by moving the telescope unit 1 directly by hand (not with tangent screws 8 and 10), the auto-focusing operation is repeatedly performed since whether the auto-focusing operation is to be done is determined based on the number (P), which corresponds to the moving speed of the telescope unit 1.

When the fine sighting has been completed, and the operator stops turning the tangent screws 8 and 10 (or stops moving the telescope unit 1 if the telescope unit 1 has been moved by hand), the number (P) becomes less than or equal to the first reference value R1 (S08: NO and S07: YES). Then, the auto-focusing operation is performed in S11, control goes to S04. Since the telescope unit 1 is not being moved at this stage, the loop of S04 and S05 is repeated.

As described above, during the fine sighting, the auto-focusing operation is repeatedly, or continuously executed. When the fine sighting has been finished and the telescope unit 1 is stopped, the auto-focusing operation is executed once in S11, and thereafter, the auto-focusing operation is not executed as far as the telescope unit 1 stays unmoved.

If measurement with respect to another aiming point is to be performed, the operator releases the tangent screws 7 and 9, and then turns the telescope 11 towards another aiming point. In this case, it is determined that the number (P) received in S04 is greater than the first reference value R1 (S05: YES), and control goes to S06. Since the telescope unit 1 is being moved, control further proceeds from S07 to S08. Thereafter, as described above, if the rough sighting is performed, the auto-focusing operation is not executed. If the rough sighting is finished and the telescope unit 1 is stopped, the auto-focusing operation is executed once in S11. Thereafter, if the fine sighting is performed, the loop of S08 through S10 is repeated and the auto-focusing operation is executed continuously.

During the operation described above, the control circuit 26 also detects the direction of the reflector placed at the aiming point as the vertical (elevational) and the horizontal angles of the sighting line L1 based on the signals from the encoder units 24 and 29, and displays the angles on the displaying devices of the operation panels 6. If the operator inputs a command for initiating the distance metering through the operation panels 6, the control circuit 26 controls the electronic distance metering unit 12 to start distance metering. In response to the phase difference signal transmitted from the electronic distance metering unit 12, the control circuit 26 calculates a distance to the reflector located on the sighting axis L1, and displays the calculated distance on the operation panels 6.

As described above, the total station does not perform the auto-focusing operation when the telescope unit 1 is moved for the rough sighting. The auto-focusing operation is performed once when the moved telescope 11 is stopped, e.g., for fastening the fixing screws, which brings the telescope 11 into the in-focus condition. Then, when the fine sighting is performed using the tangent screws (or by hand), the auto-focusing operation is continuously executed.

Thus, the total station performs the auto-focusing without operating any switch when the auto-focusing operation is required, e.g., when the fine sighting is executed. Further, the total station does not perform auto-focusing operation when it is not required, e.g., when the rough sighting is executed or when the telescope stays unmoved.

Therefore, the total station according to the first embodiment is easy to operate, and improves the efficiency of surveying operation. Further, erroneous operation of switches and/or unintentional turning of the telescope can be avoided. Furthermore, the total station according to the first embodiment reduces the power consumption for the auto-focusing operation since the auto-focusing operation is performed only when it is necessary.

In the first embodiment described above, the total station performs the auto-focusing operation once if the number (P) is less than or equal to the first reference value R1. However, the number of times of the auto-focusing operations is not limited to one but may be plural.

An operator may turn on the power switch after the rough sighting has been finished. In such a case, as shown in FIG. 4, the number (P) is received (S01), and since the telescope unit 1 is not moving (S02: YES), the auto-focusing operation is executed once at S03. Thereafter, as far as the telescope unit 1 remains unmoved, the loop of S04 and S05 is repeated. Thus, even when the operator turn on the power switch after the rough sighting has been finished, the auto-focusing operation has been finished when the operator starts the fine sighting with use of the telescope 11.

Second Embodiment

The second embodiment of the present invention will be described hereinafter.

The second embodiment is similar to the first embodiment in terms of structure of the total station 100, but a process executed by the AF controlling unit 265 is different. Therefore, only the process performed by the AF controlling unit 265 according to the second embodiment will be described.

Figure 5:
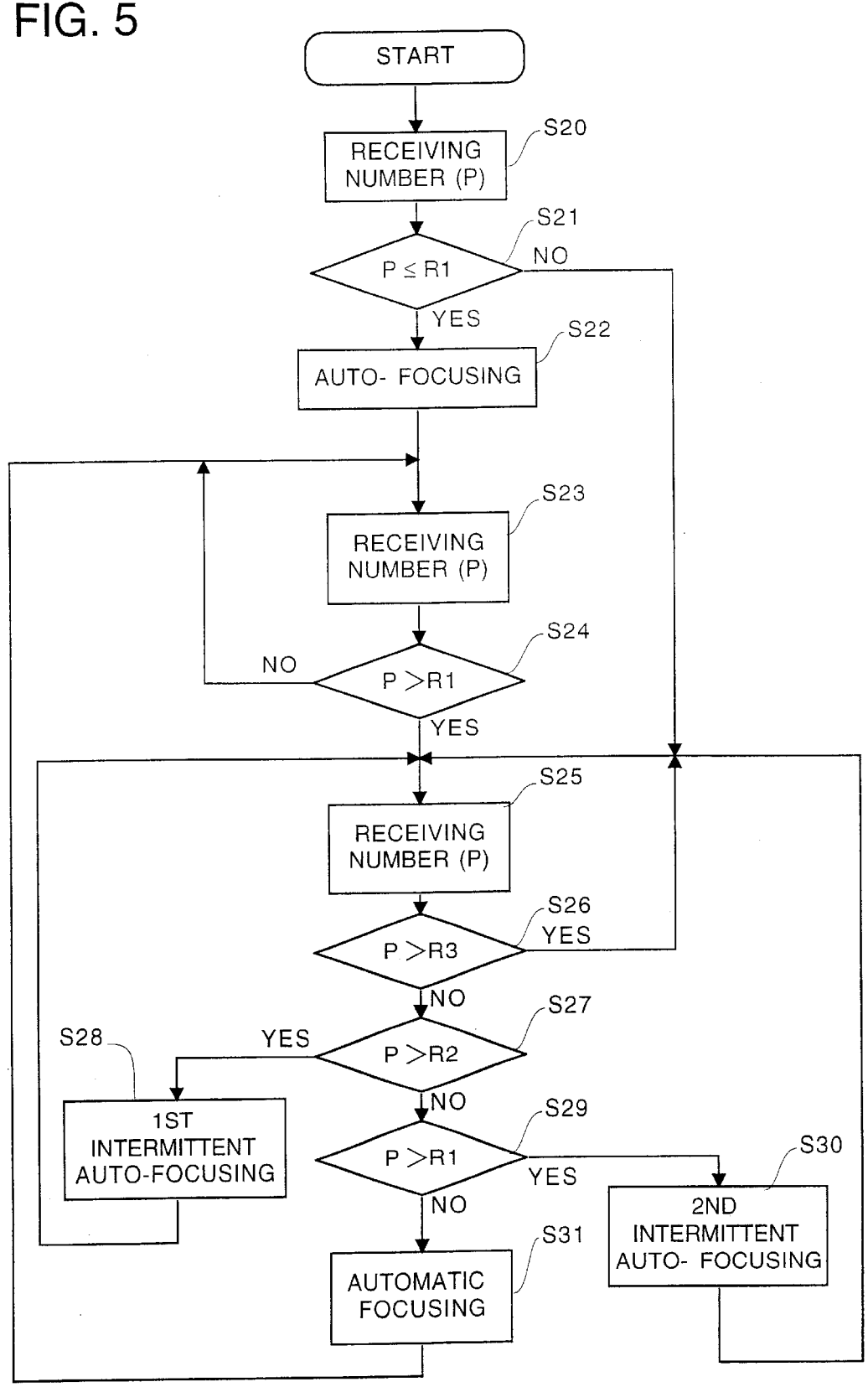
FIG. 5 is a flowchart showing a process performed in an AF controller of the second embodiment.

FIG. 5 is a flowchart showing a process performed by the AF controlling unit 265 according to the second embodiment.

The process shown in FIG. 5 starts when the main power is supplied. At first, the AF controlling unit 265 receives the number (P) from the counter unit 263 (S20), and determines whether the number (P) is less than or equal to the first reference value R1. In the second embodiment, similarly to the first embodiment, the first reference value R1 corresponds to the angular speed of 0'/sec. If the number (P) is greater than the first reference value R1, i.e., if the telescope unit 1 is being moved, control goes to S26.

If it is determined, in S21, that the number (P) is less than or equal to the first reference value R1 (S21: YES), i.e., if the telescope unit 1 is not being moved, the auto-focusing operation is executed once (S22) so that the defocus amount is reduce to the allowable amount.

In S23, the AF controlling unit 265 receives the number (P) from the counter unit 263. If the received number (P) is less than or equal to the first reference value R1 (S24: NO), i.e., if the telescope unit 1 is not moved, control returns to S23. Thus, a loop of S23 and S24 is repeated until the telescope unit I is moved, and during the loop, the auto-focusing operation is not executed. When the telescope unit 1 is moved, i.e., when the number (P) is greater than the first reference value R1 (S24: YES), control goes to S25.

In S25, the AF controlling unit 265 receives the number (P) from the counter unit 263. Then, in S26 through S31, the received number (P) is categorized in accordance with reference values R1 through R3. The first reference value R1 corresponds to the angular speed of 0'/sec., the third reference value R3 corresponds to a threshold between angular speeds of the rough sighting and the fine sighting, and the third reference value corresponds to the angular speed of 20'/sec. In the second embodiment, the fine sighting can be performed at two different angular speeds. The second reference value R2 corresponds to an angular speed which is a threshold between the two angular speeds for faster and slower fine sighting operations. The second reference value R2 corresponds to an angular speed of 10'/sec.

If the number (P) is greater than the third reference value R3 (S26: YES), control goes to S25 and the AF controlling circuit 165 receives the next number (P).

If the number (P) is less than or equal to the third reference value R3 and greater than the second reference value R2 (S26: NO; S27: YES), the a first intermittent auto-focusing operation is executed (S28), and control goes to S25.

If the number (P) is less than or equal to the second !reference value R2 and greater than the first reference value R1 (S26: NO; S27: NO; S29: YES), then a second intermittent auto-focusing operation is executed (S30), and control goes to S25.

If the number (P) is less than or equal to the first reference value R1 (S26:NO; S27:NO; S29:NO), then the auto-focusing operation is executed in S31, and control goes to S23.

Controlled as above, when the telescope unit 1 is moved for the rough sighting, the number (P) is greater than the third reference value R3, and accordingly, the loop of S25 and S26 is repeated.

When the fine sighting is performed at the faster angular speed (i.e., R2<P≦R3), the first intermittent auto-focusing operation is executed (S28). The first intermittent auto-focusing operation is an operation for executing the auto-focusing operation as described in the first embodiment at every predetermined period A1 (e.g., 1 second) while the loop of S25, S26, S27 and S28 is repeated.

When the fine sighting is performed at the slower angular speed (i.e., R1<P≦R2), the second intermittent auto-focusing operation is executed (S30). The second intermittent auto-focusing operation is an operation for executing the auto-focusing operation as described in the first embodiment at every predetermined period A2 (e.g., 2 second) while the loop of S25, S26, S27, S29 and S30 is repeated. It should be noted that A2 is preferably longer than A1.

When the telescope unit 1 is not moved, the number (P) is less than or equal to the first reference value R1, and accordingly, the auto-focusing operation is executed once at S31, and then the loop of S23 and S24 is repeated until the telescope unit 1 is moved.

As above, in the second embodiment, when the rough sighting is performed, the auto-focusing operation is not executed, when the faster fine sighting is performed, the auto-focusing operation is executed at every predetermined period A1, when the slower fine sighting is performed, the auto-focusing operation is executed at every predetermined period A2, and when the telescope unit 1 is stopped, the auto-focusing operation is executed once, and thereafter, the auto-focusing operation is not executed as far as the telescope unit 1 stays unmoved.

Operation of the Second Embodiment

Operation of the total station according to the second embodiment will be described.

At first, the operator places the reflector at the measured point, installs the total station at the station, and turns on the main switch of the total station. Then the process shown in FIG. 5 is started.

Firstly, the AF controlling unit 265 receives the number (P) from the counter unit 263 (S20). If the telescope unit 1 is not moved (S21: YES), the auto-focusing operation is executed (S22). According to the process above, even if the operator turns on the power switch not before the rough sighting is executed, but after the rough sighting has been completed, it is ensured that the auto-focusing operation is executed.

Generally, as described above, the operator moves the telescope 11 by hand with the fixing screws 7 and 9 released. Therefore, during the rough sighting, the telescope 11 is moved by a relatively large amount. Further, during the rough sighting, the operator may observe through the sighting scope 13 which has a wider field of view than the telescope 11.

When the rough sighting operation is performed, the number (P) exceeds the third reference value R3. Thus, the auto-focusing operation is not executed when the number (P) is greater than the third reference value R3, and a loop of S25 and S26 repeated as far as the rough sighting is performed.

After the rough sighting has been finished, the operator fastens the fixing screws 7 and 9 in order to prevent the telescope 11 from being turned by external forces. At this stage, since the telescope 11 is not moved, the number (P) is less than or equal to the first reference value R1 (S26:NO; S27:NO; S29:NO). Thus, the auto-focusing operation is executed in S31, and then control goes to S23, where the AF controlling unit 265 receives another number (P).

Next, the operator performs the fine sighting with use of the telescope 11. Since the auto-focusing operation is executed once in S31, the operator is able to obtain an in-focus image through the eyepiece 117 when the fine sighting is started, without operating any switch.

In the second embodiment, as the tangent screws 8 and 10, two-stage tangent screws, which enables two-stage fine sighting: faster fine sighting and slower fine sighting, are employed.

According to the second embodiment, during the faster fine sighting (S26:NO; S27:YES), the auto-focusing operation is executed at every first period A1 (S28), e.g., at every one second, and during the slower fine sighting (S26:NO; S27:NO; S29:YES), the auto-focusing operation is executed at every second period A2, e.g., at every two seconds.

Therefore, during either the faster or slower fine sighting, the operator can obtain the in-focus image without operating any switch.

After the fine sighting has been finished, the operator stops operating the tangent screws 8 and 10 and the telescope unit 1 is stopped (S26:NO; S27:NO; S29:NO). At this stage, the auto-focusing operation is executed once (in S31), and thereafter the loop of S23 and S24 is repeated until the telescope unit 1 is moved.

If the operator swings the telescope 11 after measurement with respect to one aiming point has finished, the number of pulses may exceed the third reference value R3, and the AF controlling unit 265 does not perform the auto-focusing operation.

During the above operation, the control circuit 26 also detects the direction of the reflector placed at the aiming point as the vertical (elevational) and the horizontal angles of the sighting line L1 based on the signals from the encoder units 24 and 29, and displays the angles on the displaying devices of the operation panels 6. If the operator inputs a command for initiating the distance metering through the operation panels 6, the control circuit 26 controls the electronic distance metering unit 12 to start distance metering. In response to the phase difference signal transmitted from the electronic distance metering unit 12, the control circuit 26 calculates a distance to the reflector located on the sighting axis L1, and displays the calculated distance on the operation panels 6.

As described above, the total station does not perform the auto-focusing operation when the telescope unit 1 is moved for the rough sighting. The auto-focusing operation is performed once when the moved telescope 11 is stopped, e.g., for fastening the fixing screws, which brings the telescope 11 into the in-focus condition. Then, when the faster or slower fine sighting is performed using the tangent screws (or by hand), the auto-focusing operation is executed at every first or second period.

Thus, the total station performs the auto-focusing without operating any switch when the auto-focusing operation is required, e.g., when the fine sighting is executed. Further, the total station does not perform the auto-focusing operation when it is not required, e.g., when the rough sighting is executed or when the telescope stays unmoved.

Therefore, the total station according to the second embodiment is also easy to operate, and improves the efficiency of surveying operation. Further, erroneous operation of switches and/or unintentional turning of the telescope can be avoided. Furthermore, the total station according to the second embodiment also reduces the power consumption for the auto-focusing operation since the auto-focusing operation is performed only when it is necessary.

Further, in the second embodiment, although the number (P) of pulses is compared with three reference values, and categorized in 4 ranges, the number of ranges is not limited to four, and can be changed.

Still further, although the auto-focusing operation is performed only once when the number P becomes less than or equal to the first reference value R1, it can be modified such that two or more auto-focusing operations are performed in such a condition.

Third Embodiment

The third embodiment of the present invention will be described hereinafter.

The only difference between the third embodiment and the first embodiment and/or the second embodiment, is the sequence of the process that the AF controlling unit 265 performs. Therefore, only the process performed by the AF controlling unit 265 will be described herein.

Figure 6:
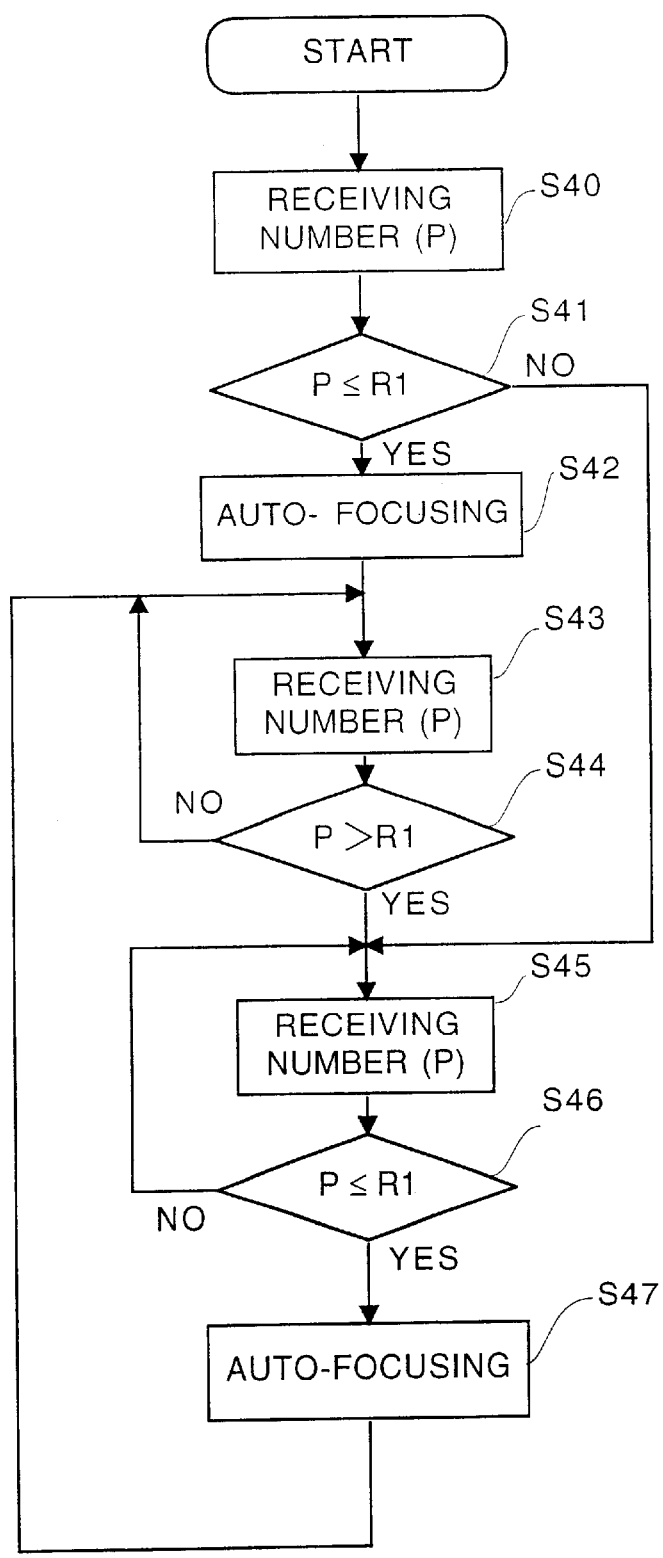
FIG. 6 is a flowchart showing a process performed in an AF controller of the third embodiment.

FIG. 6 is a flowchart showing a process performed in the AF controlling unit 265 according to the third embodiment.

The process shown in FIG. 6 is started when the main power is supplied. At first, the AF controlling unit 265 receives the number (P) counted by the counter unit 263 (S40), and judges whether the number (P) is less than or equal to the first reference value R1, which corresponds to the angular speed of 0'/sec. (S41). Thus, in S41, it is determined whether the telescope unit 1 is being moved. If the number (P) is greater than the first reference value R1 (S41:NO), i.e., if the telescope unit 1 is moved, control goes to S45.

If it is judged, in S41, that the number (P) is less than or equal to the first reference value R1, i.e., if the telescope unit 1 is not moved, the auto-focusing operation is executed (S42).

In S43, the AF controlling unit 265 receives the number (P) from the counter unit 263 again. In S44, it is judged whether 15 the (P) is greater than the first reference value R1. While the number (P) is less than or equal to the first reference value R1, i.e., while the telescope unit 1 stays unmoved, a loop of S43 and S44 is repeated, and accordingly the auto-focusing operation is not executed. If the number (P) is greater than the first reference value R1, i.e., if the telescope unit 1 is moved, control goes to S45.

In S45, the AF controlling unit 265 receives the number (P) of the pulses detected by the counter unit 263. In S46, it is judged whether the number (P) is less than or equal to the first reference value R1, i.e., it is judged whether the telescope is being moved. While the number (P) is greater than the first reference value R1, i.e., while the telescope unit 1 is moved, a loop of S45 and S46 is repeated, and therefore the auto-focusing operation is not executed. If the number (P) is less than or equal to the first reference value R1, i.e., if the telescope unit 1 is stopped, control goes from S46 to S47, and the auto-focusing operation is executed to reduce the defocus amount up to the allowable amount. After the focusing operation at S47, control goes back to S43. Then, the loop of S43 and S44 is repeated as far as the telescope unit 1 stays unmoved.

Operation of the Third Embodiment

Operation of the total station 100 according to the third embodiment will be described.

Firstly, the operator places the reflector at the measured point, installs the total station 100 at the measuring station.

When the operator turns on the main switch of the total station, the process shown in FIG. 6 is started.

At first, the AF controlling unit 265 receives the number (P) from the counter unit 263 (S40). If the number (P) is less than or equal to the first reference value R1 (S41:YES), the AF controlling unit 265 performs auto-focusing operation (S42).

After the auto-focusing operation, the operator sights the telescope 11 on the aiming point with use of the sighting scope 13 which has a relatively wide field of view (rough sighting).

During this rough sighting, the control circuit 26 (the counter unit 263) counts the number of pulses, based on the signals transmitted from the vertical encoder unit 24 and the horizontal encoder unit 29. In this situation, the number of pulses will exceed the first reference value R1. Thus, the AF controlling unit 265 does not perform the auto-focusing operation.

After the rough sighting, the operator fastens the fixing screws 7 and 9 in order to prevent the telescope 11 from being turned by external forces. When the operator fastens the fixing screws 7 and 9, the telescope 11 is not moved, and accordingly the number (P) of the pulses received in S45 is less than or equal to the first reference value R1 (S46: YES). Thus, the AF controlling unit 265 performs auto-focusing operation (S47).

Since the auto-focusing operation is executed in S47, the operator can observe an in-focus image through the eyepiece 117 without operating any switch after the rough sighting has been finished. After the auto-focusing operation (S47), control goes to S43.

Then, the operator performs the fine sighting of the telescope 11, trying to locate the image of the reflector placed at the aiming point in the center of the field of view of the telescope 11 by turning the tangent screws 8 and 10.

During the fine sighting, the number of pulses exceeds the first reference value R1 (S46: NO). Thus, the AF controlling unit 265 does not executes the auto-focusing operation.

After completing the fine sighting, the operator stops turning the tangent screws 8 and 10. Then, the successively detected number (P) of the pulses is less than or equal to the first reference value R1 (S46: YES), and the AF controlling unit 265 performs the auto-focusing operation once in S47. Then, control goes to S43, and the loop of S43 and S44 are repeated, and the auto-focusing operation is not executed.

If the measurement of a certain aiming point has been finished, and the operator tries to sight the telescope 11 on another aiming point, the number (P) of the pulses exceeds the first reference value R1 (S44:YES). Thereafter, the process similar to the above is executed depending on the movement of the telescope unit.

During the operation above, the control circuit 26 also detects the direction of the reflector placed at the aiming point as the vertical (elevational) and the horizontal angles of the sighting line L1 based on the signals from the encoder units 24 and 29, and displays the angles on the displaying devices of the operation panels 6. If the operator inputs a command for initiating the distance metering through the operation panels 6, the control circuit 26 controls the electronic distance metering unit 12 to start distance metering. In response to the phase difference signal transmitted from the electronic distance metering unit 12, the control circuit 26 calculates a distance to the reflector located on the sighting axis L1, and displays the calculated distance on the operation panels 6.

As described above, in the total station according to the third embodiment, the auto-focusing operation is executed once, when the telescope unit 1 is stopped. Thus, the auto-focusing operation is performed (1) when the power switch is turned on and it is detected that the telescope 11 is not moved; (2) when the rough sighting is finished; and (3) when the fine sighting is finished. The above-described process may be modified such that the auto-focusing operation is performed intermittently, with a relatively long interval. Further, although the auto-focusing operation is performed once when the telescope 11 is stopped in the third embodiment, it can be modified such that the auto-focusing operation may be performed intermittently.

The present disclosure relates to the subject matter contained in Japanese Patent Application No. HEI 10-113867, filed on Apr. 23, 1998, which is expressly incorporated herein by reference in its entirety.

What is claimed is:

1. A surveying instrument, comprising:
   a telescope utilized for sighting at an aiming point;
   an auto-focusing system that executes an auto-focusing operation for automatically adjusting a focusing condition of said telescope;
   a supporting member that movably supports said telescope;
   a movement detection system that detects a moving status of said telescope; and
   a controlling system that controls said auto-focusing system to perform the auto-focusing operation in accordance with the moving status of said telescope.

2. The surveying instrument according to claim 1, wherein said supporting member allows vertical rotation of said telescope.

3. The surveying instrument according to claim 1, wherein said supporting member allows horizontal rotation of said telescope.

4. The surveying instrument according to claim 1, wherein said movement detection system detects a moving speed of said telescope, said moving speed being defined as a moving amount within a predetermined unit period.

5. The surveying instrument according to claim 4, wherein said controlling system categorizes moving speeds of said telescope into a plurality of ranges, and determines a range where said detected moving speed is included, and wherein said controlling system controls said auto-focusing system in accordance with the range where said detected moving speed is included.

6. The surveying instrument according to claim 5, wherein said plurality of ranges include first, second and third ranges, a moving speed included in said first range being slower than a moving speed included in said second range, a moving speed included in said second range being slower than a moving speed included in said third range, and wherein said controlling system controls said auto-focusing system to perform the auto-focusing operation whenever said detected moving speed is included in said second range.

7. The surveying instrument according to claim 6, wherein said controlling system controls said auto-focusing system to perform the auto-focusing operation a predetermined number of times when a previously detected moving speed is included in one of said second range and said third range, and a currently detected moving speed is included in said first range.

8. The surveying instrument according to claim 5, wherein said plurality of ranges include first, second, and third ranges, a moving speed included in said first range being slower than a moving speed included in said second range, a moving speed included in said second range being slower than a moving speed included in said third range, and wherein said controlling system controls said auto-focusing system to perform the auto-focusing operation intermittently while said detected moving speed is included in said second range.

9. The surveying instrument according to claim 8, wherein a frequency of the auto-focusing operations, which are performed while said detected moving speed is included in said second range, increases, as said detected moving speed decreases.

10. The surveying instrument according to claim 9, wherein said second range is divided into a first sub-range and a second sub-range, one of a first and a second frequency being selected depending on whether said detected moving speed is included in said first sub-range or said second sub-range.

11. The surveying system according to claim 4, wherein the moving speed of said telescope is divided into a first and a second range, the moving speed included in said first range being slower than the moving speed included in said second range, and wherein said controlling system controls said auto-focusing system to perform the auto-focusing operation only when said moving speed is included in said first range.

12. A surveying instrument, comprising:

a telescope utilized for sighting at an aiming point;

an auto-focusing system that performs an auto-focusing operation for automatically adjusting a focusing condition of said telescope;

a supporting member that movably supports said telescope;

a movement detection system that detects, based on a movement of said telescope, a moving status of said telescope, said moving status including a rough sighting status, a fine sighting status, and a suspended status; and a controlling system that controls said auto-focusing system to perform the auto-focusing operation in accordance with the moving status detected by said movement detection system.

13. The surveying instrument according to claim 12, wherein said controlling system allows said auto-focusing system to perform the auto-focusing operation when the moving status of said telescope is in said fine sighting status, and inhibits said auto-focusing system from performing the auto-focusing operation when the moving status of said telescope is in said rough sighting status.

14. The surveying instrument according to claim 13, wherein said controlling system controls said auto-focusing system to perform the auto-focusing operation immediately when the moving status of said telescope has changed to said suspended status, and inhibits the auto-focusing operation thereafter, until the moving status of said telescope is changed to said fine sighting status.

15. The surveying instrument according to claim 12, wherein said controlling system controls said auto-focusing system to perform the auto-focusing operation continuously while the moving status of said telescope is said fine sighting status.

16. The surveying instrument according to claim 12, wherein said controlling system controls said auto-focusing s stem to perform the auto-focusing operation intermittently while the moving status of said telescope is said fine sighting status.

17. The surveying instrument according to claim 16, wherein frequency of the auto-focusing operations, which are performed while the moving status of said telescope is said fine sighting status, is greater as a moving speed of said telescope is faster.

18. The surveying instrument according to claim 17, wherein the moving speed of said telescope, when the moving status of said telescope is said fine sighting status, is divided into a plurality of ranges, and wherein said frequency of the auto-focusing operations varies in accordance with a range where the moving speed of said telescope is included.

19. The surveying instrument according to claim 12, including a distance metering device.

20. The surveying instrument according to claim 12, including a device that detects horizontal and elevational angles between a reference point to an aiming point, with respect to a predetermined station.

21. A surveying instrument, comprising:

a telescope utilized for sighting at an aiming point;

an auto-focusing system that executes an auto-focusing operation for automatically adjusting a focusing condition of said telescope;

a movement detection system that detects a moving status of said telescope; and a controlling system that controls said auto-focusing system to perform the auto-focusing operation in accordance with the moving status of said telescope.

* * * * *

UNITED STATES PATENT AND TRADEMARK OFFICE
CERTIFICATE OF CORRECTION

PATENT NO. : 6,354,010 B1
DATED : March 12, 2002
INVENTOR(S) : Masami Shirai

It is certified that error appears in the above-identified patent and that said Letters Patent is hereby corrected as shown below:

<u>Title page,</u>
Item [30], Foreign Application Priority Data, "May 23, 1998" should be
-- April 23, 1998 --

Signed and Sealed this

Twenty-fourth Day of September, 2002

*Attest:*

*Attesting Officer*

JAMES E. ROGAN
*Director of the United States Patent and Trademark Office*